United States Patent
Randall et al.

(10) Patent No.: US 11,841,943 B2
(45) Date of Patent: Dec. 12, 2023

(54) TAMPER DETECTION AND RESPONSE TECHNIQUES

(71) Applicant: Arm Limited, Cambridge (GB)

(72) Inventors: Joshua Randall, Austin, TX (US); Joel Thornton Irby, Austin, TX (US); Carl Wayne Vineyard, Leander, TX (US); Mudit Bhargava, Austin, TX (US)

(73) Assignee: Arm Limited, Cambridge (GB)

( * ) Notice: Subject to any disclaimer, the term of this patent is extended or adjusted under 35 U.S.C. 154(b) by 1112 days.

(21) Appl. No.: 16/584,865

(22) Filed: Sep. 26, 2019

(65) Prior Publication Data

US 2021/0097173 A1 Apr. 1, 2021

(51) Int. Cl.
*G06F 21/55* (2013.01)
*G11C 13/00* (2006.01)
*H03K 19/003* (2006.01)

(52) U.S. Cl.
CPC .......... *G06F 21/554* (2013.01); *G11C 13/004* (2013.01); *G11C 13/0069* (2013.01); *H03K 19/003* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 2008/0143373 A1* | 6/2008 | Bonaccio | G06F 21/6245 711/E12.1 |
| 2009/0228698 A1* | 9/2009 | Shirlen | H04L 63/1416 713/150 |
| 2010/0026336 A1* | 2/2010 | Bartley | H01L 23/57 326/8 |
| 2013/0300453 A1* | 11/2013 | Carapelli | G08B 13/06 326/8 |
| 2017/0084331 A1* | 3/2017 | Bhavnagarwala | G11C 13/003 |
| 2020/0012783 A1* | 1/2020 | Vineyard | G06F 21/566 |

* cited by examiner

*Primary Examiner* — Anh Q Tran
(74) *Attorney, Agent, or Firm* — Pramudji Law Group PLLC; Ari Pramudji

(57) ABSTRACT

Various implementations described herein refer to a method for tracking abnormal incidents while monitoring activity of logic circuitry. The method may include detecting a tamper event related to the abnormal incidents and storing an attack signature related to the tamper event. The attack signature may be stored in non-volatile memory (NVM), such as, e.g., correlated electron random access memory (CeRAM).

20 Claims, 7 Drawing Sheets

300

Logic_0 : Normal Operational Mode

Logic_1 : Non-Operational Mode

350

TAMPER DETECTION AND RESPONSE TECHNIQUES

BACKGROUND

This section is intended to provide information relevant to understanding the various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

In conventional computers and computer networks, an attack refers to various attempts to achieve unauthorized access of technological resources. Also, a cyberattack may refer to offensive schemes that target computer information systems, infrastructures, networks, or similar devices. For instance, an attacker may attempt to maliciously access data, functions or other restricted areas of a susceptible system without authorization. In modern computer-based systems, cyberattacks have become increasingly sophisticated and dangerous. As such, there exists a need to improve physical design implementation of on-chip circuit component behavior that inhibits and/or prevents targeted attacks.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DETAILED DESCRIPTION

Figure 1:
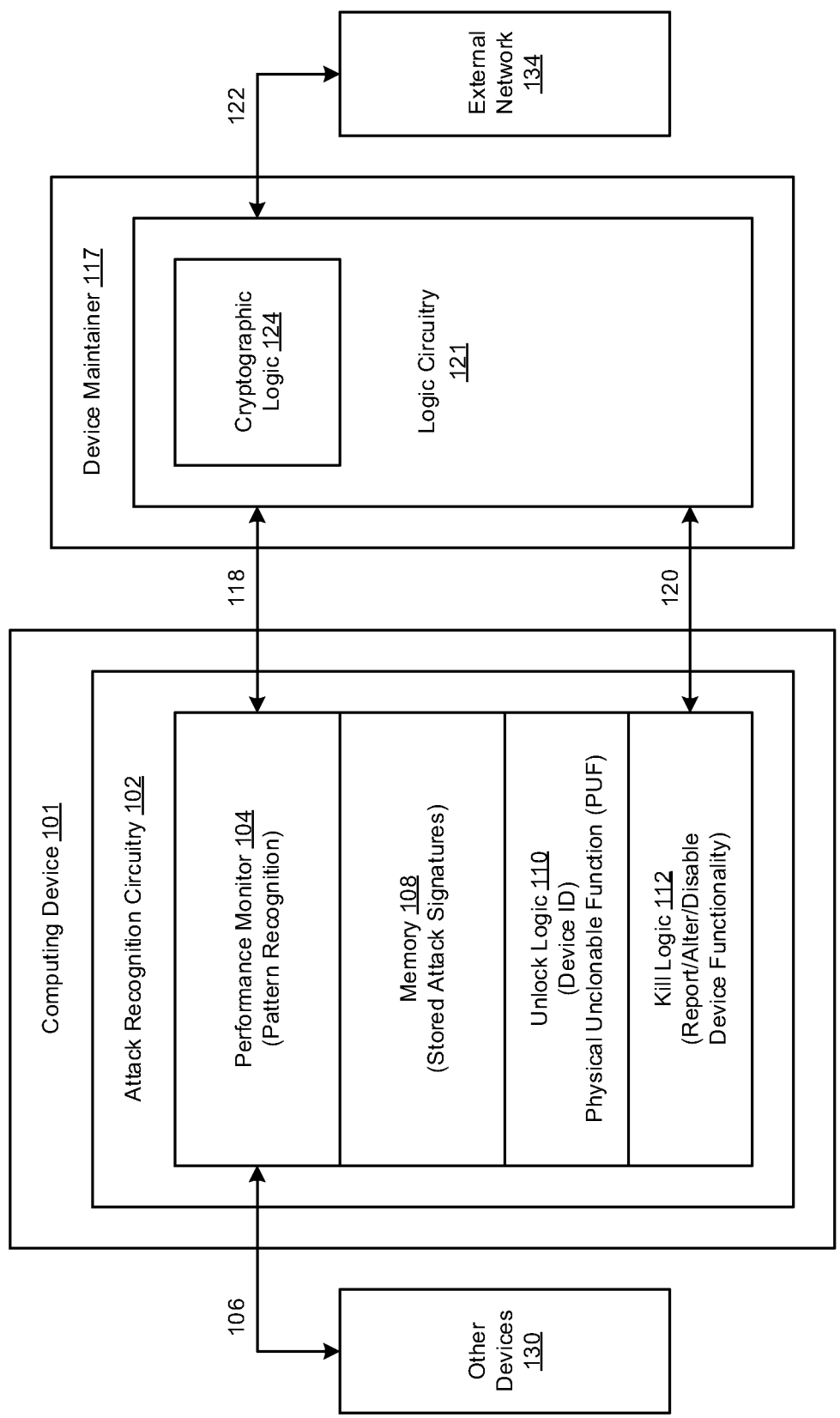
FIG. 1 illustrates a diagram of tamper detection circuitry in accordance with various implementations described herein.

Various implementations described herein are directed to tamper detection and response schemes and techniques. For instance, the various schemes and techniques described herein may provide for a system of mechanisms for detecting and responding to execution abnormalities that processing chips may encounter. These mechanisms may be effective in the presence of on-chip non-volatile memory (NVM) storage, such as, e.g., correlated electron random access memory (CeRAM).

Various implementations described herein are directed to a kill switch, such as, e.g., a CeRAM kill switch. Circuits in an SoC (i.e., system-on-a-chip) may be designed to detect execution and environmental abnormalities to inhibit or prevent various attacks, such as, e.g., side channel attacks. When an abnormality is detected, CeRAM registers may operate as kill switches to disable or hinder functionality of a chip to thereby prevent further exploitation. These CeRAM registers are non-volatile and on-chip, and a malicious actor may not re-enable functionality by rebooting or tampering with off-chip components. Tight integration of NVM with logic may enable fine grained functionality disabling, such as, disabling speculative execution in a core. The maintainer of a compromised system may provide a key combined with a unique identifier to clear the CeRAM register and re-enable functionality of a device. The identifier may involve use of a unique device ID and a physical unclonable function (PUF). High current writes to CeRAM may be leveraged to make deactivation permanent, and high current writes to CeRAM use high current for reset. The hardware may be designed to not have the ability to overwrite this strong write, which may allow the chip to decide to permanently disable functionality.

Various implementations described herein are directed to attack signatures that are related to abnormal incidents and tamper events. The attack signature may be stored in a CeRAM array when an abnormality has been identified, and the attack signature may be stored by the detection mechanism and aid in future anomaly detection. The system may potentially use the attack signatures to learn the attack, and the attack signature may also be read by the maintainer when the device is securely accessed, such as, e.g., the next time the maintainer updates the device or clears the CeRAM kill switch. This may provide the maintainer with insight into an attempted attack to assist with developing future security updates. On a shared platform, the OS (operating system) or hypervisor may be informed of perceived intrusions, and this notification technique may allow for remote notification of attacks by the maintainer (e.g., if the device is in a server farm or in an IoT sensor array), and also, this notification technique may enable an appropriate response to attacks that were caused by software.

As further described herein below, patterns that represent new attacks may be stored in CeRAM arrays of devices by device maintainers to improve activity monitoring capabilities. These CeRAM arrays may be locally located throughout the chip wherever anomalies are typically detected. For instance, CeRAM arrays that monitor speculative cache accesses may be located next to a cache, and these CeRAM arrays continuously check cache access sequences for patterns that match reported attack patterns. Since CeRAM allows storage to be closely integrated with logic on-chip, such patterns may be identifiable and actionable even in instances when memory and peripherals of the system are compromised. The non-volatile nature of CeRAM may inhibit and/or prevent attackers from clearing attack signatures with a reboot, and future hardware vulnerabilities may be mitigated by updating devices with newer attack signatures.

Also, devices may also be programmed to eagerly transmit newly encountered suspicious access patterns to other nearby devices. This may preserve attack signatures if the device fails to report attack signatures to a device maintainer. Devices that receive this transmission may also store attack signatures in localized CeRAM arrays and thereby protect themselves from similar exploitation. In this way, an attack recorded by one device may trigger an immune response across many devices. These transmissions may need to be carefully authenticated and verified, or an attacker may use this mechanism to cause multiple devices to categorize valid operation as malicious.

In addition to storing suspicious patterns, CeRAM arrays may hold patterns of valid activity that may be perceived as suspicious. In reference to false positives, if any anomaly detection circuit is discovered to be too aggressive over the lifetime of a device, valid execution patterns may be stored in CeRAM arrays so as to override false positives from that circuit. Also, overly aggressive anomaly detection circuits may be enabled or disabled using CeRAM bits updated by a device maintainer.

Various implementations of tamper detection and response techniques will be described in detail herein with reference to FIGS. 1-7B.

FIG. 1 illustrates a diagram of tamper detection and response circuitry 100 in accordance with various implementations described herein. The tamper detection and response circuitry 100 includes a computing device 101 having attack recognition circuitry 102 coupled to an external device maintainer 117 having logic circuitry 121. In some instances, the computing device 101 may include a stand-alone system having various logic circuitry, such as, e.g., a processor and memory configured for implementing the attack recognition circuitry 102. Also, in some instances, the device maintainer 117 and the logic circuitry 121 may refer to a separate, external processing chip having a processor along with cryptographic logic 124.

The attack recognition circuitry 102 includes a performance monitor 104 that is configured for pattern recognition. The performance monitor 104 may be configured to track abnormal incidents while monitoring activity of the logic circuitry 121 via a signal path 118, detect a tamper event related to the abnormal incidents, and store an attack signature related to the tamper event in memory 108. In some instances, the abnormal incidents are associated with execution abnormalities that are associated with a potential attack encountered by the device maintainer 117 and/or the logic circuitry 121. Also, the performance monitor 104 may be configured to diagnose an attack, e.g., by determining whether a detected pattern of the tamper event matches an attack signature of one or more stored tamper events stored in the memory 108. The performance monitor 104 may also be configured to initiate a response to the attack. In some instances, the response may include storing the detected pattern of the tamper event (or abnormal incident) along with the attack signature in the memory 108. In some instances, the response may also include broadcasting the detected pattern of the tamper event (or abnormal incident) to one or more other devices 130 in a network via communication link 106.

The attack recognition circuitry 102 includes memory 108 that is configured to store attack signatures. The memory 108 may be implemented with non-volatile memory (NVM), such as, e.g., correlated electron random access memory (CeRAM). The attack recognition circuitry 102 may also include unlock logic 110 that is configured as a device identification (ID) that includes a physical unclonable function (PUF). Also, the attack recognition circuitry 102 includes kill logic 112 that is configured to report, alter and/or disable functionality of the computing device 101. In some instances, the kill logic 112 may be coupled to the device maintainer 117 and the logic circuitry 121 via a signal path 120. In some instances, some functionality of the computing device 101 (or some logic circuitry related thereto) may be altered by the kill logic 112.

In various implementations, the device maintainer 117 may be another device directly connected to the computing device 101, a system connected through a network to the computing device 101, or a maintenance port on the computing device 101 that is accessible by a user with a debugging tool. Each of these systems of maintenance may process stored signatures, preload new signatures to into the computing device 101, and reset the kill switch or logic 112. In some instances, the device maintainer 117 is an external device, system, or user that may or may not be connected to the computing device 101, which may be vulnerable to attack.

As shown in FIG. 1, the computing device 101 may refer to a system block, and the device maintainer 117 may refer to a maintainer block, wherein the maintainer block is separate from the system block. In some implementations, the attack recognition circuitry 102 may be encompassed by a processor or chip multiprocessor with the device maintainer 117 separate from the processor or chip multiprocessor. In various instances, the device maintainer 117 may be used for tamper detection that may occur inside the vulnerable system, which is closely coupled to functional execution components.

In some instances, the response to an attack may refer to the kill logic 112 activating a kill switch that temporarily disables functionality of the computing device 101 so as to inhibit exploitation of the computing device 101, and the kill switch may be implemented with a correlated electron random access memory (CeRAM) cell. In some instances, the kill switch may permanently disable functionality of the computing device 101 so as to prevent any further exploitation of the computing device 101. In some instances, after a predetermined time period, the kill switch may be reset so that the temporarily disabled functionality of the computing device 101 is re-enabled with a key having a unique identifier. The performance monitor 104 and/or the kill logic 112 may be configured to read stored attack signatures in the memory 108 after applying the unique identifier.

In some instances, an ignore bit may be used as an NVM bit for disabling and/or controlling tampering detection circuitry, wherein the NVM bit may be used to filter the output of any tamper detection circuitry. For instance, if tamper detection circuitry outputs a '1' when a tamper is detected, then the output signal may be ANDed with the inverse (NOT) of the 'ignore' bit before enabling any response circuitry. This way, the maintainer 117 may effectively filter the output from any tamper detection circuitry that may provide false positives by setting the 'ignore' NVM bit to '1'. This technique may be useful to inhibit or prevent aggressive tamper detection circuitry from repeatedly activating the kill switch functionality. Also, in some cases, in reference to using the NVM bit to disable or control tampering detection circuitry, if a different circuit for tamper detection is highly aggressive, the device maintainer 117 may disable this aggressive circuit or reduce its aggressiveness with a CeRAM write. In this instance, the NVM bit with internal processor tamper detection circuitry may be useful. Thus, as a complement to a kill-bit, an ignore-bit may be used to disable or downgrade the response of the tamper detection circuitry.

The device maintainer 117 may include the logic circuitry 121 along with cryptographic logic 124. The device maintainer 117 communicates with the performance monitor 104 via the signal path 118, and the device maintainer 117 communicates with the kill logic 112 via the signal path 120. Also, the device maintainer 117 communicates with an external network 134 via the signal path 120, wherein one or more attacks may originate therefrom. In various implementations, the kill logic 112 may be configured to disable some or all functionality of the computing device 101, and the kill logic 112 may not affect the logic circuitry 121 of the device maintainer 117. Some or all logic circuitry of the computing device 101 may be disabled or altered by the kill bits related to the kill logic 112. In some instances, the logic circuitry 121 of the device maintainer 117 may be used to control at least some part of the computing device 101, and the device maintainer 117 is not controlled by the computing device 101. Generally, the computing device 101 may be vulnerable to attacks, and thus, the computing device 101 may be altered and/or disabled by the kill logic 112. As such, some or all functionality of the computing device 101 may be impacted, altered and/or disabled by the kill logic 112.

In some implementations, this system of security mechanisms may be used to prevent or mitigate effects of many types of attacks, including botnet attacks, speculative cache access attacks, and physical information leakage. If a device becomes part of a botnet that sends many small packets that cause DDOS (distributed denial-of-service), this behavior may be identified by network transmission patterns. In this case, network transactions from the system may be limited by a CeRAM bit, or the CeRAM kill switch for an entire system may render the system unusable. If a new speculative cache access attack is identified, then a pattern of accesses and flushed accesses may be stored in a CeRAM array and used to detect this attack. When such an attack is detected, a CeRAM register may disable speculative cache accesses, or the OS (i.e., operating system) may be notified of this behavior. This may reduce impact on valid programs that trigger this response and the impact on other programs on a shared system.

In various implementations, an attack may refer to various types of attacks, as generally known in the technological industry. For instance, an attack may refer to a side channel attack, such as, e.g., a differential power analysis (DPA) that involves statistically analyzing power consumption measurements from a cryptosystem. DPA attacks typically exploit biases by varying power consumption of microprocessors or other hardware while performing operations using secret keys. Also, an attack may refer to an electro-magnetic attack, such as, e.g., a differential electromagnetic analysis (DEMA) algorithm attack that may be effective against symmetric cryptography implementation. Also, an attack may refer to a differential fault analysis (DFA) that refers to a type of side channel attack in the field of cryptography and cryptanalysis. DFA attacks may be used to induce faults (e.g., unexpected environmental conditions) into cryptographic implementations so as to reveal their internal logic states. Also, some attacks may refer to speculative cache accesses or branch prediction attacks, such as, e.g., Spectre.

Figure 2:
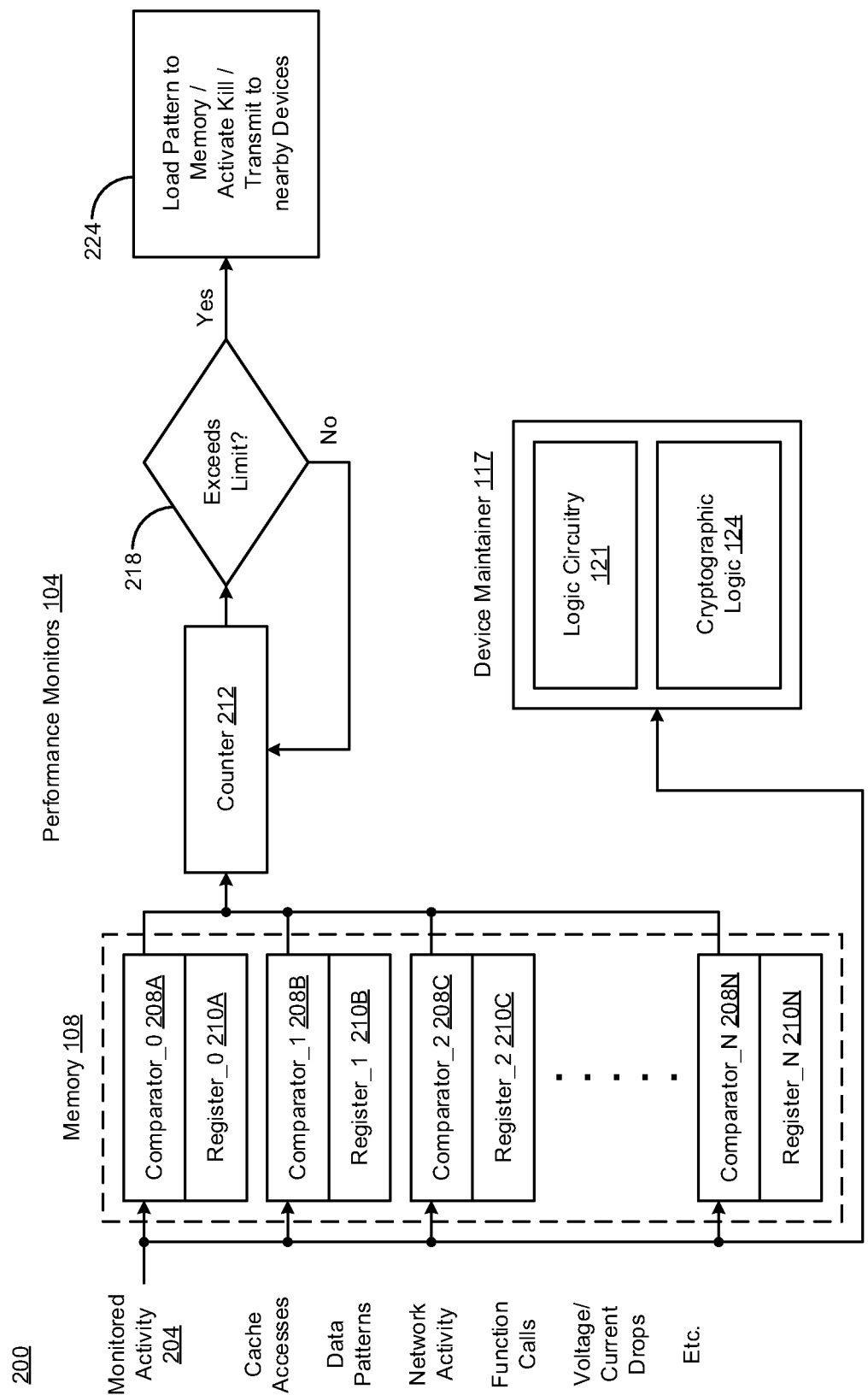
FIG. 2 illustrates a diagram of performance monitoring circuitry in accordance with various implementations described herein.

In some instances, as shown in FIG. 2 herein below, CeRAM counters and registers may be used to detect data attacks that measure voltage and current changes to extract secure information. If physical input/output (IO) channels are being measured by an attacker, the voltage and current characteristics of these channels may be observed to detect this measurement. In addition, CeRAM arrays may store suspicious voltage or current droops that may indicate tampering and/or some type of abnormal behavior. Tight integration of the CeRAM with logic on a chip may enable functionality to be disabled on a fine grain, such as disabling speculative execution within a core, disabling multi-threading, and/or disabling certain modes of cryptographic logic 124 (e.g., only allowing AES key sizes of 256 bits and not 128 or 192). This tight integration may allow a device maintainer (e.g., device maintainer 117) to update devices with new attack signatures and achieve low latency detection of these attacks.

FIG. 2 illustrates a diagram 200 of the performance monitoring circuitry 104 in accordance with various implementations described herein. In some implementations, the performance monitoring circuitry 104 of FIG. 2 may refer to the performance monitor 104 in FIG. 1. Also, the memory 108 and the device maintainer 117 along with the logic circuitry 121 and the cryptographic logic 124 may refer to similar components as described herein above in reference to FIG. 1.

As shown in FIG. 2 and as described herein above, the performance monitor 104 may be configured to monitor activity 204 associated with the logic circuitry 121 of the device maintainer 117. The monitored activity 204 may refer to various operations related to the logic circuitry 121, such as, e.g., cache accesses, data patterns, network activity, function calls, voltage drops, current drops, and similar operations. The memory 108 may include various logic for analyzing and/or diagnosing the monitored activity 204, such as, e.g., a number (N) of comparators (208A, 208B, 208C, . . . , 208N), a number (N) of registers (210A, 210B, 210C, . . . , 210N), and at least one counter 212. As shown, each comparator (208A, 208B, 208C, . . . , 208N) may be coupled to a corresponding register (210A, 210B, 210C, . . . , 210N), and each comparator (208A, 208B, 208C, . . . , 208N) may be coupled to the counter 212. Also, each comparator (208A, 208B, 208C, . . . , 208N) may receive data signals related to the monitored activity 204, store attack signatures of one or more tamper events in the corresponding registers (210A, 210B, 210C, . . . , 210N) that are implemented with NVM, such as, e.g., CeRAM.

Thus, in some implementations, the performance monitor 104 may use the memory 108 (along with the comparators 208 and the registers 210) and the counter 212 may be configured to track abnormal incidents while monitoring activity 204 related to the computing device 101, detect one or more tamper events related to the abnormal incidents, and store one or more attack signatures related to the tamper events (and/or abnormal incidents) in the memory 108. As shown, the counter 212 may count a number of tamper events (and/or abnormal incidents) encountered by the computing device 101, and in decision block 218, the performance monitor 104 may determine whether the count of the counter 212 exceeds an upper boundary or an upper limit. If not, then the performance monitor 104 continues to monitor activity 204 associated with the computing device 101, and also, the counter 212 continues to count the number of tamper events (and/or abnormal incidents) encountered by the computing device 101. If yes, then the performance monitor 104 responds to the attack by performing various operations associated therewith. For instance, the performance monitor 104 may respond to the attack (or tamper event) by loading a pattern of the monitored activity 204 or an attack signature of the tamper event to the memory 108. In some instances, the performance monitor 104 may respond to the attack (or tamper event) by activating the kill switch (e.g., in kill logic 112) to disable or at least inhibit functionality of the computing device 101. In other instances, the performance monitor 104 may respond to the attack (or tamper event) by broadcasting the detected pattern of the tamper event to one or more other devices.

Figure 3A:
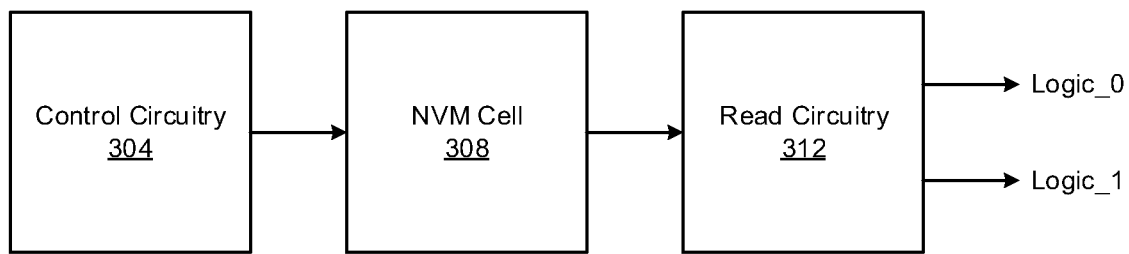
FIGS. 3A-3B illustrate various diagrams of storage circuitry in accordance with various implementations described herein.
Figure 3B:
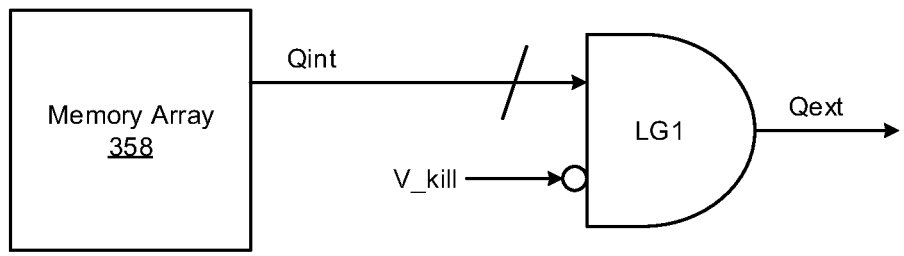

FIGS. 3A-3B illustrate various diagrams of storage circuitry in accordance with implementations described herein. In particular, FIG. 3A illustrates a diagram of storage circuitry 300, and FIG. 3B illustrates a diagram of storage circuitry 350.

As shown in FIG. 3A, the storage circuitry 300 may be referred to as a device having control circuitry 304 that detects a tamper event associated with various abnormal operating activities of logic circuitry (e.g., a processing chip having a processor or similar type of computational logic).

The storage circuitry 300 may include switch circuitry having a non-volatile memory (NVM) cell 308 that initiates a response to the tamper event by inhibiting functionality of the logic circuitry when the tamper event is detected. The NVM cell 308 may include a CeRAM cell. Also, the logic circuitry refers to a processing chip, and the abnormal incidents may be associated with execution abnormalities associated with a potential attack encountered by the processing chip.

In some instances, the storage circuitry 300 may include read circuitry 312, and the NVM cell 308 may be referred to as a kill switch. The response may refer to disabling functionality of the logic circuitry as a result of reading a logic state of the kill switch (i.e., NVM cell 308) to thereby inhibit any further exploitation of the logic circuitry. The kill switch may be permanently set to disable functionality of the logic circuitry and thereby prevent any further exploitation of the logic circuitry. The control circuitry 304 may be configured to reset the kill switch 308 after a predetermined time period so that temporarily disabled functionality of the logic circuitry is re-enabled. The read circuitry 312 may be configured to read (or sense) a logic state of the NVM cell 308. For instance, the read circuitry 312 may read (or sense) a logic_0 state or a logic_1 state, and the read (or sensed) logic state (logic_0 or logic_1) may be used to disable (or at least inhibit) functionality of logic circuitry associated with the detected tamper event (or abnormal incidents). In some instances, the logic_0 state may refer to a normal operational mode of logic circuitry, and the logic_1 state may refer to a non-operational mode of logic circuitry.

As shown in FIG. 3B, the storage circuitry 350 may include the memory 108 (having an array of NVM cells) and at least one logic gate (LG1) that are coupled together to compare one or more internal data signals (Qint) with a kill signal (V_kill) and provide one or more external output signals (Qext). For instance, the array of NVM cells 358 may be configured to provide the internal signals (Qint) to the logic gate (LG1), and the logic gate (LG1) may be configured to receive the internal signals (Qint) from the array of NVM cells 358, receive the kill signal (V_kill), and provide the external output signals (Qext). In some instances, the logic gate (LG1) may be implemented with an AND gate having an inverted input that receives the kill signal (V_kill).

Figure 4:
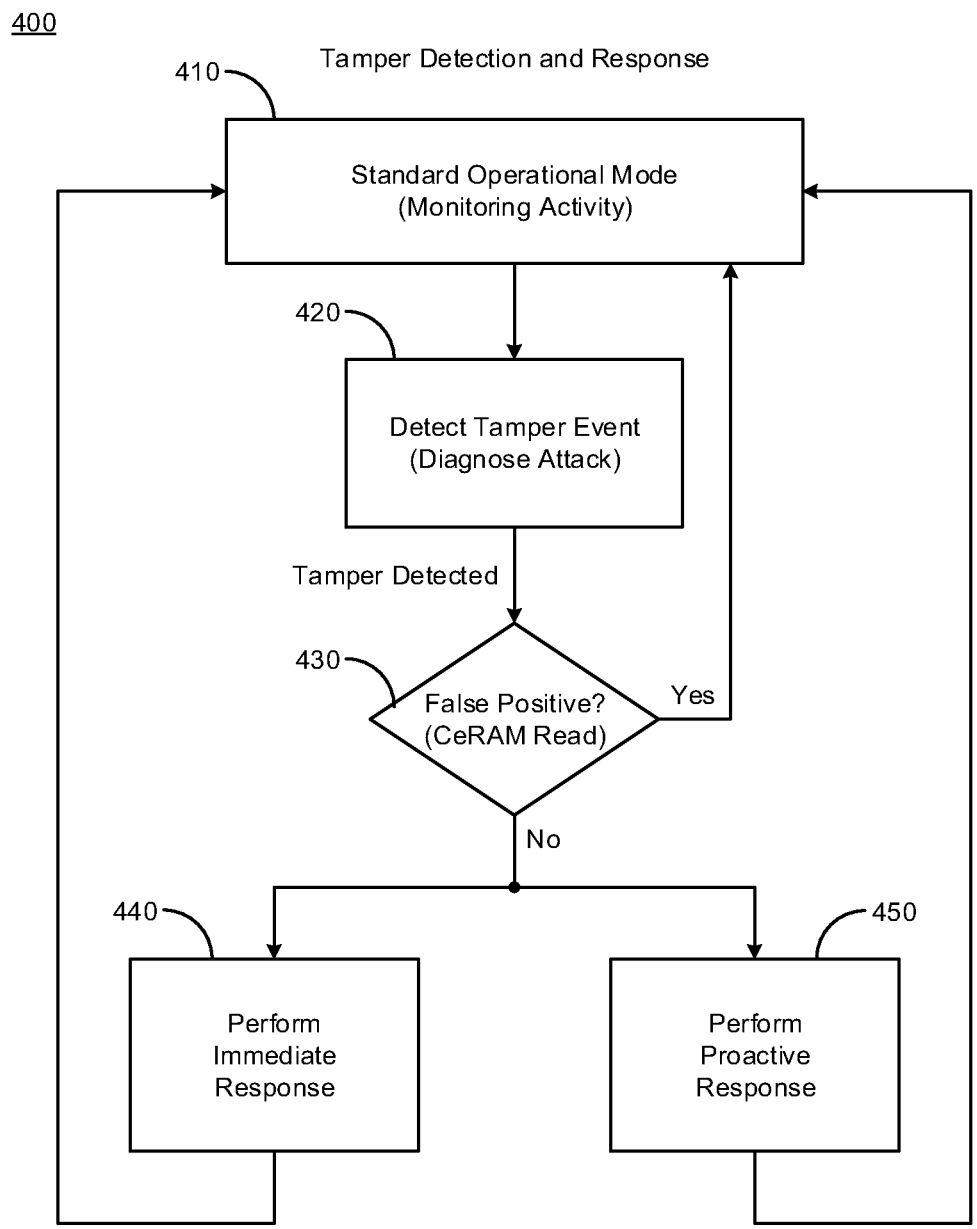
FIGS. 4-6 illustrate various process diagrams of methods for tamper detection and response in accordance with various implementations described herein.

FIG. 4 illustrates a process diagram of a method 400 for performing tamper detection and response in accordance with implementations described herein.

It should be understood that even though method 400 indicates a particular order of operation execution, in some cases, various certain portions of the operations may be executed in a different order, and on different systems. In other cases, additional operations and/or steps may be added to and/or omitted from method 400. Also, method 400 may be implemented in hardware and/or software. If implemented in hardware, the method 400 may be implemented with various components and/or circuitry, as described herein in reference to FIGS. 1-3B. Also, if implemented in software, method 400 may be implemented as a program and/or software instruction process configured for tamper detection schemes and techniques, as described herein. Also, if implemented in software, instructions related to implementing the method 400 may be stored in memory and/or a database. For instance, a computer or various other types of computing devices having at least one processor and memory may be configured to perform method 400.

At block 410, method 400 may monitor activity of a device (e.g., logic circuitry or similar) in a standard operational mode. In some instances, the logic circuitry may refer to a processing chip having a processor or similar computational logic.

At block 420, method 400 may detect a tamper event. For instance, method 400 may diagnose an attack by determining whether a pattern of the monitored activity matches an attack signature of one or more stored tamper events. In some instances, the pattern of the monitored activity refers to abnormal incidents associated with execution abnormalities of potential attacks encountered by the logic circuitry. In other instances, some other circuitry may be used to diagnose the attack, and false positive identification may be useful when it filters out other tamper detection circuitry. Also, in some cases, an associated signature may not match an attack signature if it was included in false positive signatures. As such, generally, any type of circuitry may be used or modified to detect any type of tamper.

At decision block 430, method 400 may determine whether the detected tamper event refers to a valid tamper event or a false positive, e.g., during a CeRAM read. If a false positive (or invalid tamper event) is determined, then method 400 returned to block 410 to continue monitoring activity of a device (e.g., logic circuitry or similar) in a standard operational mode. Otherwise, if a false positive is not determined (or a valid tamper event is diagnosed), then method 400 responds to the valid tamper event, e.g., by performing an immediate response in block 440 or performing a proactive response in block 450.

Thus, in some instances, at block 440, method 400 may respond to the attack by initiating the first response (e.g., an immediate response), or at block 450, method 400 may respond to the attack by initiating a second response (e.g., a proactive response) to the attack. The first response (or immediate response) may refer to activating a kill switch that disables functionality of the logic circuitry, and also, the second response (or proactive response) may refer to storing the pattern of the monitored activity as an additional attack signature. The kill switch may include NVM, such as, e.g., a CeRAM cell.

In some instances, after performing the first response (or immediate response) in block 440, method 400 may return to block 410 so as to continue monitoring activity of a device (e.g., logic circuitry or similar) in a standard operational mode. Otherwise, after performing the second response (or proactive response) in block 450, method 400 may return to block 410 so as to continue monitoring activity of a device (e.g., logic circuitry or similar) in a standard operational mode.

Figure 5:
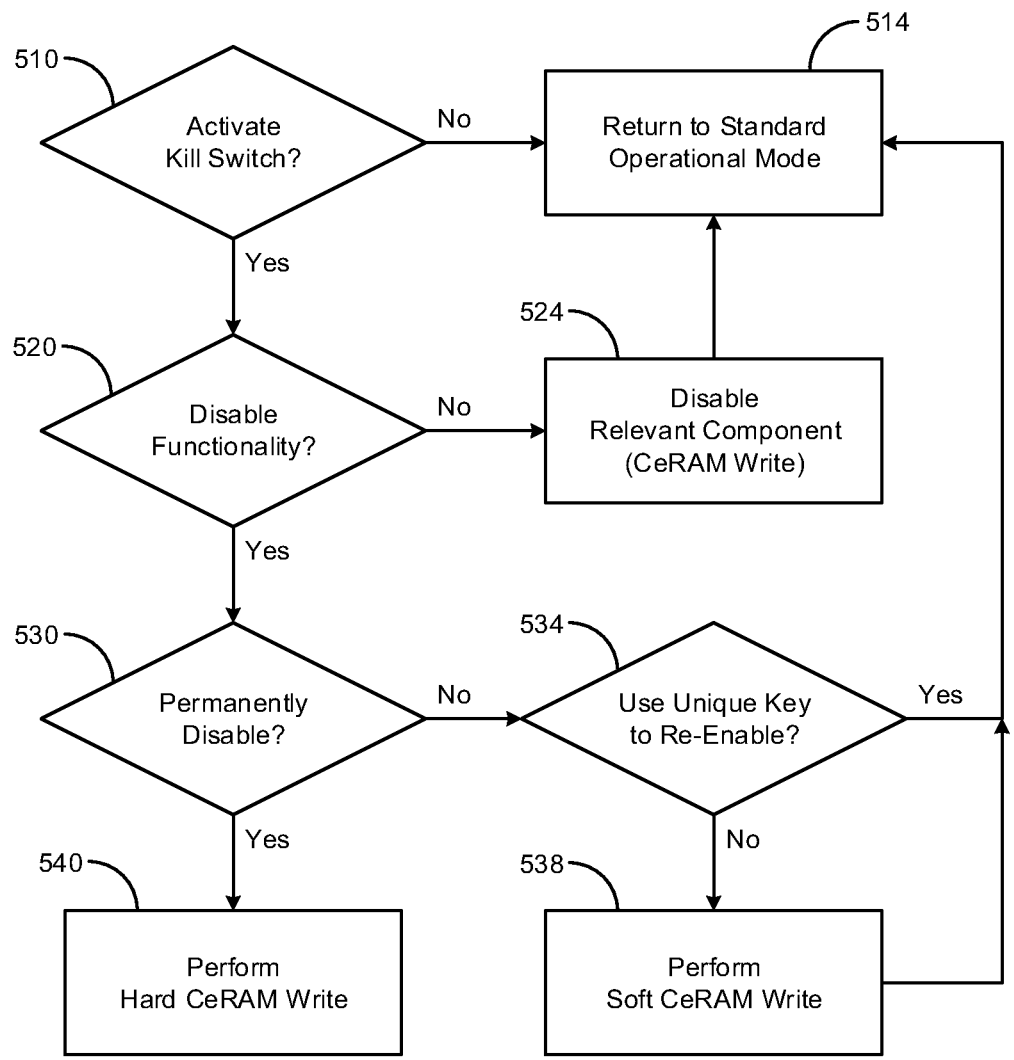

FIG. 5 illustrates a process flow diagram of a method 500 for performing an immediate response to tamper detection.

It should be understood that even though method 500 indicates a particular order of operation execution, in some cases, various certain portions of the operations may be executed in a different order, and on different systems. In other cases, additional operations and/or steps may be added to and/or omitted from method 500. Also, method 500 may be implemented in hardware and/or software. If implemented in hardware, the method 500 may be implemented with various components and/or circuitry, as described herein in reference to FIGS. 1-4. Also, if implemented in software, method 500 may be implemented as a program and/or software instruction process configured for tamper detection schemes and techniques, as described herein. Also, if implemented in software, instructions related to implementing the method 500 may be stored in memory and/or a database. For instance, a computer or various other types of computing devices having at least one processor and memory may be configured to perform method 500.

At decision block 510, method 500 may determine whether to activate the kill switch, such as, e.g., an NVM cell or a CeRAM cell. If no, then method 500 may proceed to block 514 so as to continue monitoring activity of a device (e.g., logic circuitry or similar) in a standard operational mode (e.g., return to block 410 of FIG. 4). Otherwise, if yes, method 500 proceeds to decision block 520.

At decision block 520, method 500 may determine whether to disable some or all system functionality. For instance, partially disabling system components may inhibit functionality of the logic circuitry, rather than disabling the entire system. If no, then method 500 proceeds to block 524 so as to partially disable one or more relevant components of the logic circuitry, which may refer to a CeRAM write operation, and method 500 then proceeds to block 514 so as to continue monitoring activity of a device (e.g., logic circuitry or similar) in a standard operational mode (e.g., return to block 410 of FIG. 4). Otherwise, if yes, then method 500 proceeds to decision block 530.

At decision block 530, method 500 may determine whether to permanently disable functionality of the logic circuitry. If no, then method 500 proceeds to decision block 534 to determine whether to re-enable functionality of the logic circuitry. Otherwise, if yes, then method 500 proceeds to block 540 to perform a hard CeRAM write operation, which permanently disables functionality of the logic circuitry. Thus, in some instances, the kill switch may be used to permanently disable functionality of the logic circuitry so as to prevent any further exploitation of the logic circuitry. In some implementations, re-enablement may occur at a later time, and also, re-enablement may not be an instantaneous decision. As such, the system may effectively spin on a soft kill until re-enabled. In addition, method 500 may wait for enablement, and the device maintainer 117 may refer to a device that is not constantly connected to the system (i.e., system block).

At decision block 534, method 500 may determine whether to use a unique key to re-enable functionality of the logic circuitry. If yes, then method 500 is configured to re-enable functionality of the logic circuitry, and method 500 proceeds to block 514 so as to continue monitoring activity of the device (e.g., logic circuitry or similar) in the standard operational mode (e.g., return to block 410 of FIG. 4). Otherwise, if no, then method 500 proceeds to block 538 to perform a soft CeRAM write operation, which may temporarily inhibit functionality of the logic circuitry, and then method 500 may proceed to block 514 so as to continue monitoring activity of the device (e.g., logic circuitry or similar) in the standard operational mode (e.g., return to block 410 of FIG. 4). In some instances, the kill switch may be used to reset after a predetermined time period so that the disabled functionality of the logic circuitry is re-enabled.

Figure 6:
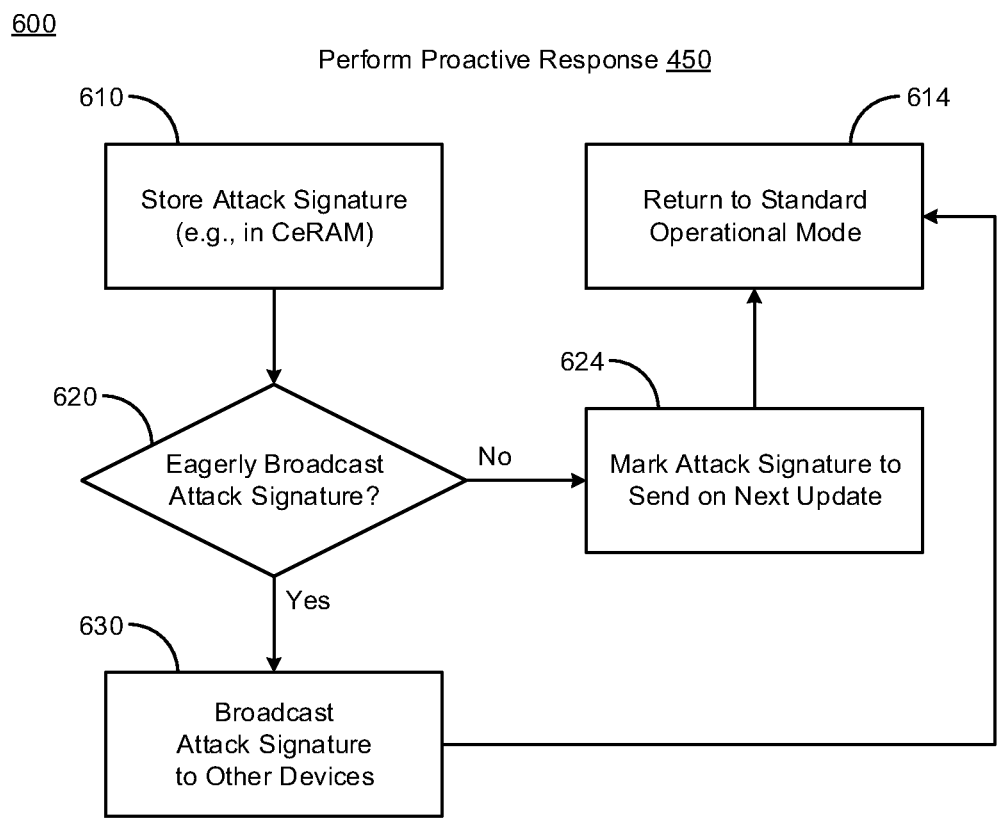

FIG. 6 illustrates a process flow diagram of a method 600 for performing a proactive response to tamper detection.

It should be understood that even though method 600 indicates a particular order of operation execution, in some cases, various certain portions of the operations may be executed in a different order, and on different systems. In other cases, additional operations and/or steps may be added to and/or omitted from method 600. Also, method 600 may be implemented in hardware and/or software. If implemented in hardware, the method 600 may be implemented with various components and/or circuitry, as described herein in reference to FIGS. 1-5. Also, if implemented in software, method 600 may be implemented as a program and/or software instruction process configured for tamper detection schemes and techniques, as described herein. Also, if implemented in software, instructions related to implementing the method 600 may be stored in memory and/or a database. For instance, a computer or various other types of computing devices having at least one processor and memory may be configured to perform method 600.

At block 610, method 600 may store an attack signature in memory 108, such as, e.g., an NVM or CeRAM array. At decision block 620, method 600 may determine whether to eagerly broadcast the attack signature to one or more other devices. If yes, then at block 630, method 600 may broadcast the attack signature to one or more other devices, such as, e.g., other device 130 of FIG. 1, and then method 600 may proceed to block 614 so as to continue monitoring activity of a device (e.g., logic circuitry or similar) in a standard operational mode (e.g., return to block 410 of FIG. 4). Otherwise, if no, then at block 624, method 600 may mark the attack signature to send on a next update, and then method 600 may proceed to block 614 so as to continue monitoring activity of a device (e.g., logic circuitry or similar) in a standard operational mode (e.g., return to block 410 of FIG. 4). In various implementations, the one or more other devices 130 may be configured to respond to the attack signature, store and use the attack signature for future tamper event detection, and/or forward the attack signature to one or more neighboring devices in a communication network.

Figure 7A:
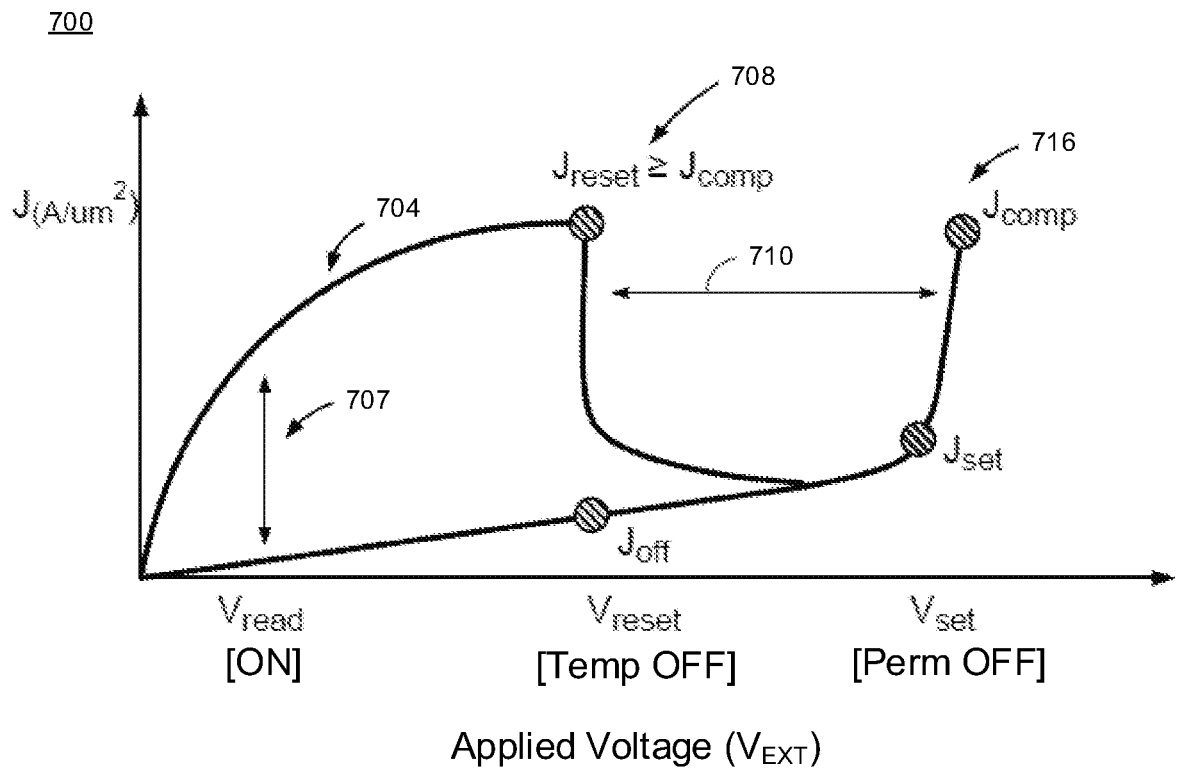
FIGS. 7A-7B illustrate various diagrams related to correlated electron material (CEM) in accordance with various implementations described herein.
Figure 7B:
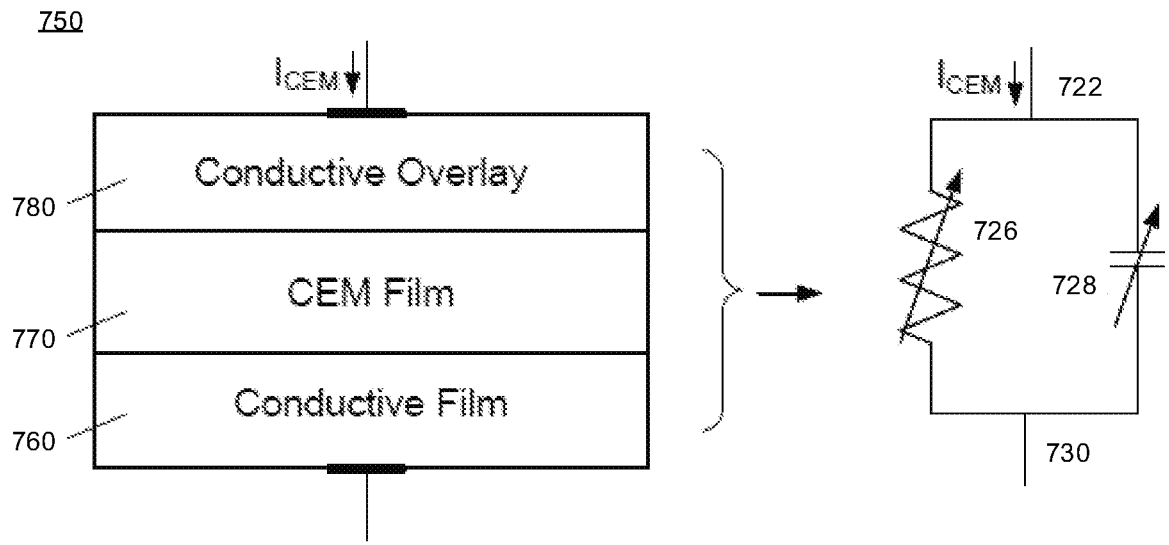

FIGS. 7A-7B illustrate various diagrams related to correlated electron material (CEM) in accordance with various implementations described herein.

Particular aspects of the present disclosure describe methods and/or processes for preparing and/or fabricating correlated electron materials (CEMs) films to form, for example, a correlated electron switch, such as may be utilized to form a correlated electron random access memory (CERAM), and/or logic devices, for example. Correlated electron materials, which may be utilized in the construction of CERAM devices and CEM switches, e.g., may also comprise a wide range of other electronic circuit types, such as, e.g., memory controllers, memory arrays, filter circuits, data converters, optical instruments, phase locked loop circuits, microwave and millimeter wave transceivers, and so forth, although claimed subject matter is not limited in scope in these respects.

In this context, a CEM switch, e.g., may exhibit a substantially rapid conductive-state-to-insulative-state, which may be enabled, at least in part, by electron correlations, which modify electrical properties of the material, rather than solid-state structural phase changes, such as in response to a change from a crystalline to an amorphous state. Such solid-state structural phase changes, such as from crystalline to amorphous states, e.g., may bring about formation of conductive filaments in certain resistive RAM devices. In one aspect, a substantially rapid conductor-to-insulator transition in a CEM device may be responsive to a quantum mechanical phenomenon that takes place within the bulk of a material, in contrast to melting/solidification or localized filament formation, e.g., in phase change and certain resistive RAM devices. Such quantum mechanical transitions between relatively conductive and relatively insulative states, and/or between a first impedance state and a second, dissimilar impedance state, e.g., in a CEM device may be understood in any one of several aspects. As used herein, the terms "relatively conductive state," "relatively lower impedance state," and/or "metal state" may be interchangeable, and/or may, at times, be referred to as a "relatively conductive/lower-impedance state." Likewise, the terms "relatively insulative state" and "relatively higher impedance state" may be used interchangeably herein, and/or may, at times, be referred to as a "relatively insulative/higher impedance state." Further, in a relatively insulative/higher-impedance state, a CEM may be characterized by a range of impedances, and, in a relatively conductive/lower-impedance state, a CEM may be characterized by a second range of impedances. In embodiments, the range of impedances may be significantly dissimilar to the second range of impedances.

In an aspect, a quantum mechanical transition of a CEM between a relatively insulative/higher impedance state and a relatively conductive/lower impedance state, wherein the relatively conductive/lower impedance state is substantially dissimilar from the insulative/higher impedance state, may be understood in terms of a Mott transition. In accordance with a Mott transition, a material may switch between a relatively insulative/higher impedance state to a relatively conductive/lower impedance state if a Mott transition condition occurs. The Mott criteria may be defined by (nc)1/3 a≈0.26, wherein nc denotes a concentration of electrons, and wherein "a" denotes the Bohr radius. If a threshold carrier concentration is achieved, such that the Mott criteria is met, the Mott transition is believed to occur. Responsive to the Mott transition occurring, the state of the CEM device changes from a relatively higher resistance/higher capacitance state (e.g., a higher-impedance/insulative state) to a relatively lower resistance/lower capacitance state (e.g., a lower-impedance/conductive state) that is substantially dissimilar from the higher resistance/higher capacitance state.

In another aspect, the Mott transition may be controlled by a localization of electrons. If carriers, such as electrons, e.g., are localized, a strong coulomb interaction between the carriers may split the bands of the CEM to bring about a relatively insulative (relatively higher impedance) state. If electrons are no longer localized, a weak coulomb interaction may dominate, which may give rise to a removal of band splitting. Responsive to such band splitting, a metal may transition from a relatively conductive state to a substantially dissimilar, insulative state.

Further, in an embodiment, switching from a relatively insulative/higher impedance state to a substantially dissimilar and relatively conductive/lower impedance state may enable a change in capacitance in addition to a change in resistance. For instance, a CEM device may exhibit a variable resistance together with a property of variable capacitance. In other words, impedance characteristics of a CEM device may include both resistive and capacitive components. For instance, in a metal state, a CEM device may comprise a relatively low electric field that may approach zero, and thus may exhibit a substantially low capacitance, which may likewise approach zero.

Similarly, in a relatively insulative/higher impedance state, which may be brought about by a higher density of bound or correlated electrons, an external electric field may be capable of penetrating a CEM and, therefore, the CEM may exhibit higher capacitance based, at least in part, on additional charges stored within the CEM. Thus, e.g., a transition from a relatively insulative/higher impedance state to a substantially dissimilar and relatively conductive/lower impedance state in a CEM device may result in changes in both resistance and capacitance, at least in particular embodiments. Such a transition may bring about additional measurable phenomena, and claimed subject matter is not limited in this respect.

In an embodiment, a device formed from a CEM may exhibit switching of impedance states responsive to a Mott-transition in a majority of the volume of the CEM comprising a CEM-based device. In an embodiment, a CEM may form a "bulk switch." As used herein, the term "bulk switch" refers to at least a substantial volume of a CEM switching a device's impedance state, such as in response to a Mott-transition. E.g., in an embodiment, substantially all CEM of a device may switch between a relatively insulative/higher impedance state and a relatively conductive/lower impedance state (e.g., a "metal" or "metallic state") responsive to a Mott transition, or from a relatively conductive/lower impedance state to a relatively insulative/higher impedance state responsive to a reverse Mott transition.

In certain implementations, a CEM may comprise one or more "D block" elements or compounds of "D block" elements, which correspond to transition metals or transition metal oxides (TMOs). CEM devices may also be implemented utilizing one or more "F block" elements or compounds of "F block" elements. A CEM may comprise one or more rare earth elements, oxides of rare earth elements, oxides comprising one or more rare earth transition metals, perovskites, yttrium, and/or ytterbium, or any other compounds comprising metals from the lanthanide or actinide series of the periodic table of the elements, e.g., and claimed subject matter is not limited in scope in this respect. A CEM may additionally comprise a dopant, such as a carbon-containing dopant and/or a nitrogen-containing dopant, wherein the atomic concentration (e.g., of carbon or nitrogen) comprise between about 0.1% to about 15.0%. As the term is used herein, a "D block" element means an element comprising scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), hassium (Hs), meitnerium (Mt), darmstadtium (Ds), roentgenium (Rg) or copernicium (Cn), or any combination thereof. A CEM formed from or comprising an "F block" element of the periodic table of the elements means a CEM comprising a metal or metal oxide, wherein the metal is from the F block of the periodic table of the elements, which may include lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), actinium (Ac), thorium (Th), protactinium (Pa), uranium (U), neptunium (Np), plutonium (Pu), americium (Am), berkelium (Bk), californium (Cf), einsteinium (Es), fermium (Fm), mendelevium (Md), nobelium (No) or lawrencium (Lr), or any combination thereof.

FIG. 7A is an illustration of an embodiment 700 of a current density (J) versus an applied voltage (VEXT) for a device formed from a CEM. At least partially in response to a voltage applied to terminals of a CEM device, e.g., during a "write operation," the CEM device may be placed into a relatively low-impedance/conductive state or a relatively high-impedance/insulative state. E.g., application of a voltage Vset and a current density Jset may enable a transition of the CEM device to a relatively low impedance/conductive state. Conversely, application of a voltage Vreset and a current density Jreset may enable a transition of the CEM device to a relatively high impedance/insulative state. As shown in FIG. 7A, reference designator 710 illustrates the voltage range that may separate Vset from Vreset. Following placement of the CEM device into a high-impedance state/insulative or into a low-impedance/conductive state, the particular state of the CEM device may be detected by application of a voltage Vread (e.g., during a read operation) and detection of a current or current density at terminals of the CEM device (e.g., utilizing read window 707).

According to an embodiment, the CEM device characterized in FIG. 7A may comprise any transition metal oxide (TMO), such as, e.g., perovskites, Mott insulators, charge exchange insulators, and Anderson disorder insulators, as well as any compound or material comprising a D block or F block element. In one aspect, the CEM device of FIG. 7A may comprise other types of TMO switching materials, though it should be understood that these are exemplary only and are not intended to limit claimed subject matter. Nickel oxide (NiO) is disclosed as one particular TMO material. NiO materials discussed herein may be doped with substitutional ligands, such as carbon-containing materials (e.g., carbonyl $(CO)_4$), or nitrogen-containing materials, such as ammonia ($NH_3$), e.g., which may establish and/or stabilize material properties and/or enable a P-type operation in which a CEM may be more conductive when placed into a low-impedance/conductive state. Thus, in another particular example, NiO doped with substitutional ligands may be expressed as NiO:Lx, where Lx may indicate a ligand element or compound and x may indicate a number of units of the ligand for one unit of NiO. A value of x may be determined for any specific ligand and any specific combination of ligand with NiO or with any other transition metal compound by balancing valences. Other dopant ligands, which may enable or increase conductivity in a low-impedance/conductive state in addition to carbonyl may include: nitrosyl (NO), an isocyanide (RNC wherein R is H, C1-C6 alkyl or C6-C10 aryl), a phosphine (R3P wherein R is C1-C6 alkyl or C6-C10 aryl), triphenylphosphine (PPh3), an alkyne (e.g., ethyne) or phenanthroline (C12H8N2), bipyridine (C10H8N2), ethylenediamine (C2H4(NH2)2), acetonitrile (CH3CN), fluoride (F), chloride (Cl), bromide (Br), cyanide (CN), sulfur (S), carbon (C), and others.

In this context, a "P-type" doped CEM as referred to herein means a first type of CEM comprising a particular molecular dopant that exhibits increased electrical conductivity, relative to an undoped CEM, when the CEM is operated in a relatively low-impedance/conductive state. Introduction of a substitutional ligand, such as CO and NH3, may operate to enhance the P-type nature of a NiO-based CEM. Accordingly, an attribute of P-type operation of a CEM may include, at least in particular embodiments, an ability to tailor or customize electrical conductivity of a CEM, operated in a relatively low-impedance/conductive state, by controlling an atomic concentration of a P-type dopant in a CEM. In particular embodiments, an increased atomic concentration of a P-type dopant may enable increased electrical conductivity of a CEM, although claimed subject matter is not limited in this respect. In particular embodiments, changes in atomic concentration or atomic percentage of P-type dopant in a CEM device may be observed in the characteristics of region 704 of FIG. 7A, as described herein, wherein an increase in P-type dopant brings about a steeper (e.g., more positive) slope of region 704 to indicate higher conductivity.

In this context, a "P-type" doped CEM as referred to herein means a first type of CEM comprising a particular molecular dopant that exhibits increased electrical conductivity, relative to an undoped CEM, while the CEM is operated in a relatively low-impedance/conductive state. Introduction of a substitutional ligand, such as CO and NH3, may operate to enhance the P-type nature of a NiO-based CEM. Accordingly, an attribute of P-type operation of a CEM may include, at least in particular embodiments, an ability to tailor or customize electrical conductivity of a CEM, operated in a relatively low-impedance/conductive state, by controlling an atomic concentration of a P-type dopant in a CEM. In particular embodiments, an increased atomic concentration of a P-type dopant may enable increased electrical conductivity of a CEM, although claimed subject matter is not limited in this respect. In particular embodiments, changes in atomic concentration or atomic percentage of P-type dopant in a CEM device may be observed in the characteristics of region 704 of FIG. 7A, as described herein, wherein an increase in P-type dopant brings about a steeper (e.g., more positive) slope of region 704 to indicate higher conductivity.

In another embodiment, the CEM device represented by the current density versus voltage profile of FIG. 7A, may comprise other TMO materials, such as carbon-containing ligands or nitrogen-containing ligands, though it should be understood that these are exemplary only and are not intended to limit claimed subject matter. NiO, e.g., may be doped with substitutional carbon- or nitrogen-containing ligands, which may stabilize switching properties in a manner similar to stabilization switching properties responsive to use of a carbon-containing dopant species (e.g., carbonyl). In particular, NiO materials disclosed herein may include nitrogen-containing molecules of the form CxHyNz (wherein x>0, y>0, z>0, and wherein at least x, y, or z comprise values>0) such as ammonia (NH3), cyano (CN—), azide ion (N3-) ethylene diamine (C2H8N2), phen(1,10-phenanthroline) (1.0 nm and about 50.0 C12H8N2), 2,2'bipyridine (C10,H8N2), ethylenediamine ((C2H4(NH2)2), pyridine (C5H5N), acetonitrile (CH3CN), and cyanosulfanides such as thiocyanate (NCS—). NiO switching materials disclosed herein may include members of an oxynitride family (NxOy, wherein x and y comprise whole numbers, and wherein x>0 and y>0 and at least x or y comprise values>0), which may include, e.g., nitric oxide (NO), nitrous oxide (N2O), nitrogen dioxide (NO2), or precursors with an NO3- ligand.

In accordance with FIG. 7A, if sufficient bias voltage is applied (e.g., exceeding a band-splitting potential) and the aforementioned Mott condition is satisfied (e.g., injected electron holes are of a population comparable to a population of electrons in a switching region), a CEM device may switch between a relatively low-impedance/conductive state to a relatively high-impedance/insulative state, e.g., responsive to a Mott transition. This may correspond to point 708 of the voltage versus current density profile of FIG. 7A. At, or suitably near this point, electrons are no longer screened and become localized near the metal ion. This correlation may result in a strong electron-to-electron interaction potential, which may operate to split the bands to form a relatively high-impedance/insulative material. If the CEM device comprises a relatively high impedance/insulative state, current may be generated by transportation of electron holes. Consequently, if a threshold voltage is applied across terminals of the CEM device, electrons may be injected into a metal-insulator-metal (MIM) diode over the potential barrier of the MIM device. In certain embodiments, injection of a threshold current of electrons, at a threshold potential applied across terminals of a CEM device, may perform a "set" operation, which places the CEM device into a low impedance/conductive state. In a low-impedance/conductive state, an increase in electrons may screen incoming electrons and remove a localization of electrons, which may operate to collapse the band-splitting potential, thereby giving rise to the low-impedance/conductive state.

In accordance with particular embodiments, current in a CEM device may be controlled by an externally applied "compliance" condition, which may be determined at least partially on the basis of an applied external current, which may be limited during a write operation, e.g., to place the CEM device into a relatively high-impedance/insulative state. This externally applied compliance current may, in some embodiments, also set a condition of a current density for a subsequent reset operation to place the CEM device into a relatively high impedance/insulative state. As shown in the particular implementation of FIG. 7A, a voltage Vset may be applied during a write operation to give rise to a current density Jcomp, such as at point 716, to place the CEM device into a relatively low-impedance/conductive state, which may determine a compliance condition for placing the CEM device into a relatively high-impedance/insulative state in a subsequent write operation. As shown in FIG. 7A, the CEM device may be subsequently placed into a low impedance/conductive state by application of an externally applied voltage (Vreset), which may give rise to a current density Jreset Jcomp at a voltage referenced by 708 in FIG. 7A.

In embodiments, compliance may set a number of electrons in a CEM device that may be "captured" by holes for the Mott transition. In other words, a current applied in a write operation to place a CEM device into a relatively low-impedance/conductive memory state may determine a number of holes to be injected to the CEM device for subsequently transitioning the CEM device to a relatively high-impedance/insulative state.

As pointed out above, a reset condition may occur in response to a Mott transition at point 708. As pointed out above, such a Mott transition may give rise to a condition in a CEM device in which a concentration of electrons n approximately equals, or becomes at least comparable to, a concentration of electron holes p. This condition may be modeled according to expression (1) as follows:

$$\lambda_{TF} n^{\frac{1}{3}} = C \sim 0.26 \tag{1}$$

$$n = \left(\frac{C}{\lambda_{TF}}\right)^3$$

In expression (1), λTF corresponds to a Thomas Fermi screening length, and C is a constant.

According to an embodiment, a current or current density in region 704 of the voltage versus current density profile shown in FIG. 7A, may exist in response to injection of holes from a voltage signal applied across terminals of a CEM device, which may correspond to P-type operation of the CEM device. Here, injection of holes may meet a Mott transition criterion for the low-impedance/conductive state to high-impedance/insulative state transition at current IMI as a threshold voltage VMI is applied across terminals of a CEM device. This may be modeled according to expression (2) as follows:

$$I_{MI}(V_{MI}) = \frac{dQ(V_{MI})}{dt} \approx \frac{Q(V_{MI})}{t} \tag{2}$$

$$Q(V_{MI}) = qn(V_{MI})$$

In expression (2), Q(VMI) corresponds to the charged injected (holes or electrons) and is a function of an applied voltage. Injection of electrons and/or holes to enable a Mott transition may occur between bands and in response to threshold voltage VMI, and threshold current IMI. By equating electron concentration n with a charge concentration to bring about a Mott transition by holes injected by IMI in expression (2) according to expression (1), a dependency of such a threshold voltage VMI on Thomas Fermi screening length λTF may be modeled according to expression (3), as follows:

$$I_{MI}(V_{MI}) = \frac{Q(V_{MI})}{t}\frac{qn(V_{MI})}{t} = \frac{q}{t}\left(\frac{C}{\lambda_{TF}}\right)^3 \tag{3}$$

$$J_{reset}(V_{MI}) = J_{MI}(V_{MI}) = \frac{I_{MI}(V_{MI})}{A_{CEM}} = \frac{q}{A_{CEM}t}\left(\frac{C}{\lambda_{TF}(V_{MI})}\right)^3$$

In expression (3), ACEM is a cross-sectional area of a CEM device; and make the italics) may represent a current density through the CEM device to be applied to the CEM device at a threshold voltage VMI, which may place the CEM device into a relatively high-impedance/insulative state.

According to an embodiment, a CEM device, which may be utilized to form a CEM switch, a CERAM memory device, or a variety of other electronic devices comprising one or more correlated electron materials, may be placed into a relatively low-impedance/conductive memory state, such as by transitioning from a relatively high-impedance/insulative state, e.g., via injection of a sufficient quantity of electrons to satisfy a Mott transition criteria. In transitioning a CEM device to a relatively low impedance/conductive state, if enough electrons are injected and the potential across the terminals of the CEM device overcomes a threshold switching potential (e.g., Vset), injected electrons may begin to screen. As previously mentioned, screening may operate to unlocalize double-occupied electrons to collapse the band-splitting potential, thereby bringing about a relatively low-impedance/conductive state.

In particular embodiments, changes in impedance states of a CEM device, may be brought about by "back-donation" of electrons of compounds comprising NixOy (wherein the subscripts "x" and "y" comprise whole numbers). As the term is used herein, "back-donation" refers to a supplying of one or more electrons (e.g., increased electron density) to a transition metal, transition metal oxide, or any combination thereof (e.g., to an atomic orbital of a metal), by an adjacent molecule of a lattice structure, such as a ligand or dopant. Back-donation also refers to reversible donation of electrons (e.g., an increase electron density) from a metal atom to an unoccupied π-antibonding orbital on a ligand or dopant. Back-donation may permit a transition metal, transition metal compound, transition metal oxide, or a combination thereof, to maintain an ionization state that is favorable to electrical conduction under an influence of an applied voltage. In certain embodiments, back-donation in a CEM, e.g., may occur responsive to use of carbon-containing dopants, such as carbonyl (CO)4, or a nitrogen-containing dopant species, such as ammonia (NH3), ethylene diamine (C2H8N2), or members of an oxynitride family (NxOy), e.g., which may permit a CEM to exhibit a property in which electrons are controllably, and reversibly, "donated" to a conduction band of the transition metal or transition metal oxide, such as nickel, e.g., during operation of a device or circuit comprising a CEM. Back donation may be reversed, e.g., in a nickel oxide material (e.g., NiO:CO or NiO:NH3), thereby permitting the nickel oxide material to switch to exhibiting a substantially dissimilar impedance property, such as a high impedance/insulative property, during device operation.

Thus, in this context, an electron back-donating material refers to a material that exhibits an impedance switching property, such as switching from a first impedance state to a substantially dissimilar second impedance state (e.g., from a relatively low impedance state to a relatively high impedance state, or vice versa) based, at least in part, on influence of an applied voltage to control donation of electrons, and reversal of the electron donation, to and from a conduction band of the CEM.

In some embodiments, by way of back-donation, a CEM switch comprising a transition metal, transition metal compound, or a transition metal oxide, may exhibit low-impedance/conductive properties if the transition metal, such as nickel, e.g., is placed into an oxidation state of 2+ (e.g., Ni2+ in a material, such as NiO:CO or NiO:NH3). Conversely, electron back-donation may be reversed if a transition metal, such as nickel, e.g., is placed into an oxidation state of 1+ or 3+. Accordingly, during operation of a CEM device, back-donation may result in "disproportionation," which may comprise substantially simultaneous oxidation and reduction reactions, substantially in accordance with expression (4), below:

$$2Ni2+ \rightarrow Ni1+ + Ni3+ \quad (4)$$

Such disproportionation, in this instance, refers to formation of nickel ions as Ni1++Ni3+ as shown in expression (4), which may bring about, e.g., a relatively high impedance/insulative state during operation of the CEM device. In an embodiment, a dopant such as a carbon-containing ligand, carbonyl (CO) or a nitrogen-containing ligand, such as an ammonia molecule (NH3), may permit sharing of electrons during operation of a CEM device so as to give rise to the disproportionation reaction of expression (4), and its reversal, substantially in accordance with expression (5), below:

$$Ni1+ + Ni3+ \rightarrow 2Ni2+ \quad (5)$$

As previously mentioned, reversal of the disproportionation reaction, as shown in expression (5), permits nickel-based CEM to return to a relatively low-impedance/conductive state.

In embodiments, depending on a molecular concentration of NiO:CO or NiO:NH3, e.g., which may vary from values approximately in the range of an atomic percentage of about 0.1% to about 15.0%, Vreset and Vset, as shown in FIG. 7A, may vary approximately in the range of about 0.1 V to about 10.0 V subject to the condition that Vset≥Vreset. For instance, in one possible embodiment, Vreset may occur at a voltage approximately in the range of about 0.1 V to about 1.0 V, and Vset may occur at a voltage approximately in the range of about 1.0 V to about 2.0 V. It should be noted, however, that variations in Vset and Vreset may occur based, at least in part, on a variety of factors, such as atomic concentration of an electron back-donating material, such as NiO:CO or NiO:NH3 and other materials present in the CEM device, as well as other process variations, and claimed subject matter is not limited in this respect.

FIG. 7B is an illustration of an embodiment 750 of a switching device comprising a CEM and a schematic diagram of an equivalent circuit of a CEM switch. As previously mentioned, a correlated electron device, such as a CEM switch, a CERAM array, or other type of device utilizing one or more correlated electron materials may comprise a variable or complex impedance device that may exhibit characteristics of both variable resistance and variable capacitance. In other words, impedance characteristics for a CEM variable impedance device, such as a device comprising conductive film 760, CEM film 770, and conductive overlay 780, may depend at least in part on resistance and capacitance characteristics of the device if measured across device terminals 722 and 730. In an embodiment, an equivalent circuit for a variable impedance device may comprise a variable resistor, such as variable resistor 726, in parallel with a variable capacitor, such as variable capacitor 728. Of course, although a variable resistor 726 and variable capacitor 728 are depicted in FIG. 7B as comprising discrete components, a variable impedance device, such as device of embodiment 750, may comprise a substantially homogenous CEM film and claimed subject matter is not limited in this respect.

Table 1 below depicts an example truth table for an example variable impedance device, such as the device of embodiment 750.

TABLE 1

| Correlated Electron Switch Truth Table | | |
|---|---|---|
| Resistance | Capacitance | Impedance |
| $R_{high}(V_{applied})$ | $C_{high}(V_{applied})$ | $Z_{high}(V_{applied})$ |
| $R_{low}(V_{applied})$ | $C_{low}(V_{applied}) \sim 0$ | $Z_{low}(V_{applied})$ |

In an embodiment, Table 1 shows that a resistance of a variable impedance device, such as the device of embodiment 750, may transition between a low-impedance/conductive state and a substantially dissimilar, high-impedance/insulative state as a function at least partially dependent on a voltage applied across a CEM device. In an embodiment, an impedance exhibited at a low-impedance/conductive state may be approximately in the range of 10.0-100,000.0 times lower than an impedance exhibited in a high-impedance/insulative state. In other embodiments, an impedance exhibited at a low-impedance/conductive state may be approximately in the range of 5.0 to 10.0 times lower than an impedance exhibited in a high-impedance/insulative state. It should be noted that claimed subject matter is not limited to any particular impedance ratios between high-impedance/insulative states and low-impedance/conductive states. Table 1 shows that a capacitance of a variable impedance device, e.g., the device of embodiment 750, may transition between a lower capacitance state, which, in an embodiment, may have approximately zero (or negligible) capacitance, and a higher capacitance state that is a function, at least in part, of a voltage applied across a CEM device.

In certain embodiments, atomic layer deposition may be utilized to form or to fabricate films comprising NiO materials, such as NiO:CO or NiO:NH3. In this context, a "layer" as the term is used herein means a sheet or coating of material, which may be disposed on or over an underlying formation, such as a conductive or insulating substrate. For instance, a layer deposited on an underlying substrate by way of an atomic layer deposition process may comprise a thickness dimension comparable to that of a single atom, which may comprise, e.g., a fraction of an angstrom (e.g., 0.6 Å). However, in other embodiments, a layer may encompass a sheet or coating comprising a thickness dimension greater than that of a single atom depending, e.g., on a process utilized to fabricate films comprising a CEM film. Additionally, a "layer" may be oriented horizontally (e.g. a "horizontal" layer), oriented vertically (e.g., a "vertical"

layer), or may be positioned in any other orientation, such as diagonally. In embodiments, a CEM film may comprise a sufficient number of layers, to permit electron back-donation during operation of a CEM device in a circuit environment, e.g., to give rise to a low-impedance/conductive state. During operation in a circuit environment, e.g., electron back-donation may be reversed so as to give rise to a substantially dissimilar impedance state, such as a high-impedance/insulative state.

In this context, a "substrate" as used herein means a structure comprising a surface that enables materials, such as materials having particular electrical properties (e.g., conductive properties, insulative properties, etc.) to be deposited or placed on or over the substrate. For instance, in a CEM-based device, conductive film 760 may operate to convey an electrical current to a CEM film in contact with conductive film 760. A conductive film, such as conductive film 760, e.g., may comprise a titanium-based and/or titanium-containing material, such as titanium nitride (TiN), fabricated in layers, e.g., for use in a CEM switch other type of CEM-based device. In other embodiments, conductive film 760 may comprise other types of conductive materials, such as titanium nitride, platinum, copper, aluminum, cobalt, nickel, tungsten, tungsten nitride, cobalt silicide, ruthenium oxide, chromium, gold, palladium, indium tin oxide, tantalum, silver, iridium, or any combination thereof, and claimed subject matter is not limited to any particular composition of conductive film material.

In embodiments, in which conductive film 760 comprises titanium nitride, e.g., conductive film 760 may be formed utilizing precursors such as titanium tetrachloride (TiCl4), which may comprise chlorine as a potential dopant species as the chlorine atoms diffuse into a CEM. In another embodiment, a TiN conductive film may be formed utilizing tetrakis dimethylamido titanium (TDMAT), tetrakis diethylamido titanium (TDEAT), and/or titanium isopropoxide (TTIP), which may comprise carbon as a dopant species as carbon atoms diffuse into the CEM. It should be noted that titanium-based and/or titanium-containing precursor materials may comprise dopant species in addition to chlorine and/or carbon and claimed subject matter is not limited in this respect. Precursors may be used with nitrogen (e.g., co-flow) as a dopant species in the form of NH3.

In other embodiments, conductive film 760 may comprise a tantalum-based and/or a tantalum-containing material, such as tantalum nitride (TaN), formed in layers, for use in a CERAM device or other type of CEM-based device. Also, a TaN conductive film may be formed utilizing precursors such as pentakisdimethylamido tantalum (PDMAT), which may comprise carbon as a dopant species. In another embodiment, a TaN conductive film may be formed utilizing tantalum ethoxide (TAETO), which may also comprise carbon as a dopant species. In another embodiment, a TaN conductive film may be formed utilizing tantalum pentachloride (TaCl5), which may comprise chlorine as a dopant species. It should be noted that tantalum-based and/or tantalum-containing precursor materials may comprise dopant species in addition to chlorine and/or carbon and claimed subject matter is not limited in this respect. Precursors may be used with nitrogen (e.g., co-flow) as a dopant species in the form of NH3.

In other embodiments, conductive film 760 may comprise a tungsten-based and/or a tungsten-containing material formed in layers, such as tungsten-nitride (WN), e.g., for use in a CERAM device or other type of CEM-based device. In embodiments, a WN conductive film may be formed utilizing precursors such as tungsten hexacarbonyl (W(CO)6) and/or cyclopentadienyltungsten(II) tricarbonyl hydride, both of which may comprise carbon as a dopant species. In another embodiment, a WN conductive film may be formed utilizing triamminetungsten tricarbonyl ((NH3)3W(CO)3) and/or tungsten pentacarbonyl methylbutylisonitrile (W(CO)5(C5H11NC), both of which may comprise carbon or nitrogen as a dopant species. It should be noted that tungsten-based and/or tungsten precursor materials may comprise dopant species in addition to nitrogen and/or carbon and claimed subject matter is not limited in this respect. Precursors may be used with nitrogen (e.g., co-flow) as a dopant species in the form of NH3.

In particular embodiments, formation of CEM films on or over a conductive film may utilize two or more precursors to deposit components of, e.g., NiO:CO or NiO:NH3, or other transition metal oxide, transition metal, or combination thereof, onto a conductive material such as a conductive film. In an embodiment, layers of a CEM film may be deposited utilizing separate precursor molecules, AX and BY, according to expression (6A), below:

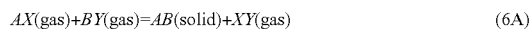

$$AX(\text{gas}) + BY(\text{gas}) = AB(\text{solid}) + XY(\text{gas}) \quad (6A)$$

Wherein "A" of expression (6A) corresponds to a transition metal, transition metal compound, transition metal oxide, or any combination thereof. In embodiments, a transition metal oxide may comprise nickel, but may comprise other transition metals, transition metal compounds, and/or transition metal oxides, such as aluminum, cadmium, chromium, cobalt, copper, gold, iron, manganese, mercury, molybdenum, nickel palladium, rhenium, ruthenium, silver, tantalum, tin, titanium, vanadium, yttrium, and zinc (which may be linked to an anion, such as oxygen or other types of ligands), or combinations thereof, although claimed subject matter is not limited in scope in this respect. In particular embodiments, compounds that comprise more than one transition metal oxide may also be utilized, such as yttrium titanate (YTiO3).

In embodiments, "X" of expression (6A) may comprise a ligand, such as organic ligand, comprising amidinate (AMD), dicyclopentadienyl (Cp)2, diethylcyclopentadienyl (EtCp)2, Bis(2,2,6,6-tetramethylheptane-3,5-dionato) ((thd)2), acetylacetonate (acac), bis(methylcyclopentadienyl) ((CH3C5H4)2), dimethylglyoximate (dmg)2, 2-amino-pent-2-en-4-onato (apo)2, (dmamb)2 where dmamb=1-dimethyl-amino-2-methyl-2-butanolate, (dmamp)2 where dmamp=1-dimethylamino-2-methyl-2-propanolate, Bis (pentamethylcyclopentadienyl) (C5(CH3)5)2 and carbonyl (CO)4. Accordingly, in some embodiments, nickel-based precursor AX may comprise, e.g., nickel amidinate (Ni (AMD)), nickel dicyclopentadienyl (Ni(Cp)2), nickel diethylcyclopentadienyl (Ni(EtCp)2), Bis(2,2,6,6-tetramethyl-heptane-3,5-dionato)Ni(II) (Ni(thd)2), nickel acetylacetonate (Ni(acac)2), bis(methylcyclopentadienyl) nickel (Ni(CH3C5H4)2, Nickel dimethylglyoximate (Ni (dmg)2), nickel 2-amino-pent-2-en-4-onato (Ni(apo)2), Ni(dmamb)2 where dmamb=1-dimethylamino-2-methyl-2-butanolate, Ni(dmamp)2 where dmamp=1-dimethylamino-2-methyl-2-propanolate, Bis(pentamethylcyclopentadienyl) nickel (Ni(C5(CH3)5)2, and nickel carbonyl (Ni(CO)4), just to name a few examples.

However, in particular embodiments, a dopant operating as an electron back-donating species in addition to precursors AX and BY may be utilized to form layers of a TMO film. An electron back-donating species, which may co-flow with precursor AX, may permit formation of electron back-donating compounds, substantially in accordance with expression (6B), below. In embodiments, a dopant species or a precursor to a dopant species, such as carbonyl (CO)4, ammonia (NH3), methane (CH4), carbon monoxide (CO), or other precursors and/or dopant species may be utilized to provide electron back-donating ligands listed above. Thus, expression (6A) may be modified to include an additional dopant ligand comprising an electron back-donating material substantially in accordance with expression (6B), below:

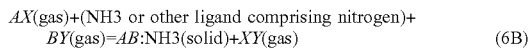

$$AX(\text{gas})+(\text{NH3 or other ligand comprising nitrogen})+BY(\text{gas})=AB:\text{NH3(solid)}+XY(\text{gas}) \quad (6B)$$

It should be noted that concentrations, such as atomic concentrations, of precursors, such as AX, BY, and NH3 (or other ligand comprising nitrogen) of expressions (6A) and (6B) may be adjusted to give rise to a final atomic concentration of nitrogen-containing or carbon-containing dopant to permit electron back-donation in a fabricated CEM device. As referred to herein, the term "dopant atomic concentration" means the concentration of atoms in the finished material that derive from the substitutional ligand. For instance, in the case in which the substitutional ligand is CO, the atomic concentration of CO in percentage terms comprises the total number of carbon atoms that comprise the material film divided by the total number of atoms in the material film, multiplied by 100.0. In another instance, for the case in which the substitutional ligand is NH3, the atomic concentration of NH3 comprises the total number of nitrogen atoms that comprise the material film divided by the total number of atoms in the material film, multiplied by 100.0.

In particular embodiments, nitrogen- or carbon-containing dopants may comprise ammonia (NH3), carbon monoxide (CO), or carbonyl (CO)4 in an atomic concentration of between about 0.1% and about 15.0%. In particular embodiments, atomic concentrations of dopants, such as NH3 and CO, may comprise a more limited range of atomic concentrations such as, e.g., between about 1.0% and about 15.0%. However, claimed subject matter is not necessarily limited to the above-identified precursors and/or atomic concentrations. It should be noted that claimed subject matter is intended to embrace all such precursors and atomic concentrations of dopants utilized in atomic layer deposition, chemical vapor deposition, plasma chemical vapor deposition, sputter deposition, physical vapor deposition, hot wire chemical vapor deposition, laser enhanced chemical vapor deposition, laser enhanced atomic layer deposition, rapid thermal chemical vapor deposition, spin on deposition, gas cluster ion beam deposition, or the like, utilized in fabrication of CEM devices from TMO materials. In expressions (6A) and (6B), "BY" may comprise an oxidizer, such as water (H2O), oxygen (O2), ozone (O3), plasma O2, hydrogen peroxide (H2O2). In other embodiments, "BY" may comprise CO, O2+(CH4), or nitric oxide (NO)+water (H2O) or an oxynitride or carbon-containing a gaseous oxidizing or oxynitridizing agent. In other embodiments, plasma may be used with an oxidizer (BY) to form oxygen radicals (O*). Likewise, plasma may be used with a dopant species to form an activated species to control dopant concentration in a CEM.

In particular embodiments, such as embodiments utilizing atomic layer deposition, a conductive film, such as conductive film 760, may be exposed to precursors, such as AX and BY of expression (6B), as well as dopants providing electron back-donation (such as ammonia or other ligands comprising metal-nitrogen bonds, including, e.g., nickel-amides, nickel-imides, nickel-amidinates, or combinations thereof) in a heated chamber, which may attain, e.g., a temperature of approximately in the range of 20.0° C. to 1000.0° C., e.g., or between temperatures approximately in the range of 20.0° C. and 500.0° C. in certain embodiments. In one particular embodiment, in which atomic layer deposition of NiO:NH3, e.g., is performed, chamber temperature ranges approximately in the range of 20.0° C. and 400.0° C. may be utilized. Responsive to exposure to precursor gases (e.g., AX, BY, NH3, or other ligand comprising nitrogen), such gases may be purged from the heated chamber for durations approximately in the range of 0.5 seconds to 180.0 seconds. It should be noted, however, that these are merely examples of potentially suitable ranges of chamber temperature and/or time and claimed subject matter is not limited in this respect.

In certain embodiments, a single two-precursor cycle (e.g., AX and BY, as described with reference to expression (6A) or a single three-precursor cycle (e.g., AX, NH3, CH4, or other ligand comprising nitrogen, carbon, or other electron back-donating dopant derived from an substitutional ligand and BY, as described with reference to expression (6B) utilizing atomic layer deposition may bring about a layer of a TMO material film comprising a thickness dimension approximately in the range of 0.6 Å to 5.0 Å per cycle). Accordingly, in one embodiment, if an atomic layer deposition process is capable of depositing layers of a TMO material film comprising a thickness dimension of approximately 0.6 Å, 800-900 two-precursor cycles may be utilized to bring about a TMO material film comprising a thickness dimension of approximately 500.0 Å. It should be noted that atomic layer deposition may be utilized to form TMO material films having other thickness dimensions, such as thickness dimensions approximately in the range of about 15.0 Å to about 1500.0 Å, e.g., and claimed subject matter is not limited in this respect.

In particular embodiments, responsive to one or more two-precursor cycles (e.g., AX and BY), or three-precursor cycles (AX, NH3, CH4, or other ligand comprising nitrogen, carbon or other back-donating dopant material and BY), of atomic layer deposition, a TMO material film may be exposed to elevated temperatures, which may, at least in part, enable formation of a CEM device from a TMO material film. Exposure of the TMO material film to an elevated temperature may additionally enable activation of a back-donating dopant derived from a substitutional ligand, such as in the form of carbon monoxide, carbonyl, or ammonia, responsive to repositioning of the dopant to metal oxide lattice structures of the CEM device film.

Thus, in this context, an "elevated temperature" means a temperature at which substitutional or substitutional ligands evaporate from a TMO material film, and/or are repositioned within a TMO material film, to such an extent that the TMO material film transitions from a resistive film to a film that is capable of switching between a relatively high-impedance/insulative state to a relatively low-impedance/conductive state. E.g., in certain embodiments, a TMO material film exposed to an elevated temperature within a chamber of about 100.0° C. to about 800.0° C. for a duration of about 30.0 seconds to about 120.0 minutes may permit evaporation of substitutional ligands from the TMO material film so as to form a CEM film. Additionally, in certain embodiments, a TMO material film exposed to an elevated temperature within a chamber of about 100.0° C. to about 800.0° C. for a duration of about 30.0 seconds to about 120.0 minutes may permit repositioning of substitutional ligands, e.g., at oxygen vacancies within a lattice structure of a metal oxide. In particular embodiments, elevated temperatures and exposure durations may comprise more narrow ranges, such as, e.g., temperatures of about 200.0° C. to about 500.0° C. for about 1.0 minute to about 60.0 minutes, e.g., and claimed subject matter is not limited in these respects.

In particular embodiments, a CEM device manufactured in accordance with the above-described process may exhibit a "born on" property in which the device exhibits relatively low impedance (relatively high conductivity) immediately following fabrication of the device. Accordingly, if a CEM device is integrated into a larger electronics environment, e.g., at initial activation a relatively small voltage applied to a CEM device may permit a relatively high current flow through the CEM device, as shown by region 704 of FIG. 7A. For instance, as previously described herein, in at least one possible embodiment, Vreset may occur at a voltage approximately in the range of about 0.1 V to about 1.0 V, and Vset may occur at a voltage approximately in the range of about 1.0 V to about 2.0 V. Accordingly, electrical switching voltages operating in a range of about 2.0 V, or less, may permit a memory circuit, e.g., to write to a CERAM memory device, to read from a CERAM memory device, or to change state of a CERAM switch. Such relatively low voltage operation may reduce complexity, cost, and may provide other advantages over competing memory and/or switching device technologies.

In particular embodiments, two or more CEM devices may be formed within a particular layer of an integrated circuit at least in part by atomic layer deposition of a CEM. In a further embodiment, one or more of a plurality of correlated electron switch devices of a first correlated electron switch material and one or more of a plurality of correlated electron switch devices of a second correlated electron switch material may be formed, at least in part, by a combination of blanket deposition and selective epitaxial deposition. Additionally, in an embodiment, first and second access devices may be positioned substantially adjacent to first and second CEM devices, respectively.

In a further embodiment, one or more of a plurality of CEM devices may be positioned within two or more levels of an integrated circuit at one or more intersections of electrically conductive metal layers of a first level and electrically conductive metal layers of a second level, which may be positioned over the first level of conductive metal layers. In this context a "metal layer" as the term is used herein, means a conductor that routes an electrical current from a first location to a second location of a layer of a multi-level CEM switching device. For instance, a conductive metal layer may transport electrical current to or from an access device located at an intersection of a conductive metal layer of first level and a conductive metal layer of the second level. In certain embodiments, fabrication of a switching device formed from a multi-level CEM device, such as devices formed utilizing conductive metal layers positioned at multiple levels of a CEM switching device may be utilized in CEM-based memory devices in which conductive metal layer positioned at multiple levels may facilitate an increase in bitline density. Increases in bitline density may bring about more efficient and/or more highly integrated approaches toward controlling access to memory cells of CEM-based random access memory arrays.

Additionally, in this context, a "level" as the term is used herein, means a discrete surface, which a conductive metal layer may traverse, wherein the discrete surface is separated from discrete surfaces immediately above and/or immediately below, by an insulating material. For instance, as described herein, a conductive metal layer traversing a first level may be separated from a conductive metal layer traversing a second level by an insulating material, such as silicon nitride. In this context, a "multi-level" switching device, as the term is used herein, means a device to perform a switching function, such as from a high-impedance/insulative state to a low-impedance state, utilizing two or more of the above-described "levels."

As described herein, responsive to depositing one or more dopant layers on or over one or more layers of a first material, such as a transition metal, a transition metal oxide, a transition metal compound or alloy, dopant concentration of a CEM may be accurately controlled. Additionally, by depositing one or more dopant layers on or over one or more layers of a first material, localized regions of CEM may comprise differing atomic concentrations of dopants so as to provide an approach toward tailoring or customizing a dopant concentration profile. Further, dopant concentration profiles within a CEM may be increased via adjusting annealing temperatures and/or annealing durations. In addition to the above-identified advantages, particular embodiments may provide an approach toward fabricating or forming a common source electrode, which may be useful in fabricating three-dimensional structures utilized for NAND flash memory. However, claimed subject matter is not limited to the above-identified advantages.

Described herein are various implementations of a method. The method may include tracking abnormal incidents while monitoring activity of logic circuitry. The method may include detecting a tamper event related to the abnormal incidents. The method may include storing an attack signature related to the tamper event.

Described herein are various implementations of a device. The device may include logic circuitry and control circuitry that detects a tamper event associated with abnormal operating activity of the logic circuitry. The device may include switch circuitry having a non-volatile memory (NVM) cell that initiates a response to the tamper event by inhibiting functionality of the logic circuitry when the tamper event is detected.

Described herein are various implementations of a method. The method may include monitoring activity of logic circuitry and diagnosing an attack by determining whether a pattern of the monitored activity matches an attack signature of one or more stored tamper events. The method may include responding to the attack by initiating a first response or a second response to the attack. In some instances, the first response may refer to activating a kill switch that disables functionality of the logic circuitry, and also, the second response may refer to storing the pattern of the monitored activity as an additional attack signature.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
    tracking abnormal incidents while monitoring activity of logic circuitry;
    detecting a tamper event related to the abnormal incidents;
    storing an attack signature related to the tamper event; and
    detecting a pattern of the tamper event that matches the attack signature so as to initiate a response to the tamper event.

2. The method of claim 1, wherein the logic circuitry refers to a processing chip, and wherein the abnormal incidents are associated with execution abnormalities associated with a potential attack encountered by the processing chip.

3. The method of claim 1, wherein the attack signature is stored in non-volatile memory (NVM) comprising correlated electron random access memory (CeRAM).

4. A method comprising:
    tracking abnormal incidents while monitoring activity of logic circuitry;
    detecting a tamper event related to the abnormal incidents;
    storing an attack signature related to the tamper event;
    diagnosing an attack by determining whether a detected pattern of the tamper event matches the attack signature of one or more stored tamper events; and
    initiating a response to the attack.

5. The method of claim 4, wherein the response comprises activating a kill switch that temporarily disables functionality of the logic circuitry so as to inhibit exploitation of the logic circuitry, and wherein the kill switch is implemented with a correlated electron random access memory (CeRAM) cell.

6. The method of claim 4, wherein the response comprises activating a kill switch that permanently disables functionality of the logic circuitry so as to prevent any further exploitation of the logic circuitry, and wherein the kill switch is implemented with a correlated electron random access memory (CeRAM) cell.

7. The method of claim 5, wherein the kill switch is reset so that the temporarily disabled functionality of the logic circuitry is re-enabled with a key having a unique identifier.

8. The method of claim 7, further comprising:
    reading stored attack signatures after applying the unique identifier.

9. The method of claim 4, wherein the response comprises broadcasting the detected pattern of the tamper event to one or more other devices, and wherein the method further comprises externally accessing the attack signature via a secure channel by a device maintainer.

10. A method comprising:
    tracking abnormal incidents while monitoring activity of logic circuitry;
    detecting a tamper event related to the abnormal incidents; and
    storing an attack signature related to the tamper event,
    wherein the attack signature of one or more stored tamper events is stored in registers having correlated electron random access memory (CeRAM).

11. A device, comprising:
    logic circuitry;
    control circuitry that detects a tamper event associated with abnormal operating activity of the logic circuitry, wherein the control circuitry is configured to detect a pattern of the tamper event that matches a stored attack signature; and
    switch circuitry having a non-volatile memory (NVM) cell that initiates a response to the tamper event by inhibiting functionality of the logic circuitry when the tamper event is detected.

12. The device of claim 11, wherein the non-volatile memory (NVM) cell comprises a correlated electron random access memory (CeRAM) cell.

13. The device of claim 11, wherein the logic circuitry refers to a processing chip, and wherein the abnormal incidents are associated with execution abnormalities associated with a potential attack encountered by the processing chip.

14. The device of claim 11, wherein the NVM cell refers to a kill switch, and wherein the response refers to disabling functionality of the logic circuitry as a result of reading a logic state of the kill switch to thereby inhibit any further exploitation of the logic circuitry.

15. The device of claim 14, wherein the kill switch is permanently set to disable functionality of the logic circuitry and prevent any further exploitation of the logic circuitry.

16. The device of claim 14, wherein the control circuitry resets the kill switch so that the disabled functionality of the logic circuitry is re-enabled externally through a secure mechanism.

17. A method, comprising:
monitoring activity of logic circuitry;
diagnosing an attack by determining whether a pattern of the monitored activity matches an attack signature of one or more stored tamper events;
responding to the attack by initiating a first response or a second response to the attack, wherein:
the first response refers to activating a kill switch that disables functionality of the logic circuitry, and
the second response refers to storing the pattern of the monitored activity as an additional attack signature.

18. The method of claim 17, wherein:
the logic circuitry refers to a processing chip,
the pattern of the monitored activity refers to abnormal incidents associated with execution abnormalities of potential attacks encountered by the processing chip, and
the kill switch is implemented with a correlated electron random access memory (CeRAM) cell.

19. The method of claim 17, wherein:
the kill switch is reset so that the disabled functionality of the logic circuitry is re-enabled, or
the kill switch permanently disables functionality of the logic circuitry to prevent any further exploitation of the logic circuitry.

20. The method of claim 17, the second response further refers to broadcasting the attack signature to one or more other devices, wherein:
the one or more other devices are configured to respond to the attack signature;
the one or more other devices are configured to store and use the attack signature for future tamper event detection, and
the one or more other devices are configured to forward the attack signature to one or more neighboring devices.

* * * * *